United States Patent [19]

Schneider

[11] 4,257,032

[45] Mar. 17, 1981

[54] CIRCUIT AND PROCESS FOR AUTOMATICALLY ADDRESSING A PLURALITY OF MOBILE SUBSTATIONS FROM A CENTRAL STATION

[75] Inventor: Rüdiger Schneider, Viernheim, Fed. Rep. of Germany

[73] Assignee: BBC Aktiengesellschaft Brown, Boveri & Cie, Baden, Switzerland

[21] Appl. No.: 936,096

[22] Filed: Aug. 23, 1978

[30] Foreign Application Priority Data

Sep. 1, 1977 [DE] Fed. Rep. of Germany ....... 2739305

[51] Int. Cl.³ .......................... H04Q 9/10; B61L 3/00; B61C 3/00
[52] U.S. Cl. ................................ 340/171 A; 105/61; 246/167 R
[58] Field of Search ................. 340/171 R, 171 A, 24, 340/47; 246/5, 167 R, 49, 56, 23, 62, 28 K, 122, 182 R; 105/61

[56] References Cited

U.S. PATENT DOCUMENTS 3,838,272  9/1974  Bull ................................. 246/167 R
4,042,810  8/1977  Mosher ............................. 105/61

Primary Examiner—Donald J. Yusko
Attorney, Agent, or Firm—Orville N. Greene

[57] ABSTRACT

A method is described for the automatic addressing of several mobile substations arranged in series from a central station. A two-wire line transmits information in two frequency channels, this line remaining open for direct current. Means are provided for determining the location of the central station with respect to the substation. The method can be used in connection with train sets.

9 Claims, 5 Drawing Figures

CIRCUIT AND PROCESS FOR AUTOMATICALLY ADDRESSING A PLURALITY OF MOBILE SUBSTATIONS FROM A CENTRAL STATION

BACKGROUND OF THE INVENTION

The present invention relates to a method for automatically addressing a plurality of mobile substations from a central station, the mobile stations being arranged in series. More particularly, the present invention relates to a method wherein a double-wire line serves to transmit information in two frequency channels with orders and reports being transmitted in sequence. The invention is also directed towards a circuit arrangement for carrying out this method.

One field of use of the invention resides in the sector of transportion; for example for controlling trains in a railway network, and preferably in trains with center buffer coupling. This invention has particular use in connection with the automation of train operations such as the German Federal Railway, by remote action devices on the train.

In "Ein Fernwirksystem zur automatischen Meldungsund Befehlsubertragung innerhalb von Zugverbanden" (A remote action system for automatic transmission of reports and orders within connection trains) by H.-H. Muller and K.-M. Schultze, published in Techn. Mitt. AEG-Telefunken 61 (1971) 6, pages 318 to 320, there is described a remote-action system which automatically addresses railroad cars which are connected to form a train and cyclically checks the completeness of the entire train. This system was developed to transmit orders and reports in trains of the European railway network after introduction of the automatic center buffer coupling. This future automatic coupling will simultaneously couple, among other things, electric lines. In this way the prerequisites are created for introducing a system for the transmission of information in the train.

With the known combination of a cyclic and a spontaneous transmission system, the condition of the train (for example, the completeness of the train and breakdown and operating reports) can be sent from a plurality of substations (for example, each individual car) to a central station (for example, the cab of the motor car). Orders (for example "uncouple", "close doors", etc.) may also be transmitted from the central station to the substations. This information is transmitted within the train over a two-wire line using a time division multiplex signal.

After the train has been assembled (i.e., cab and cars placed together to form a train) and the information line has been connected through the train, the addressing process is initiated by a voltage pulse which effects in each car the opening of a normally closed relay contact thus effecting the opening of the information line. At the same time, a terminal resistance is placed in front of and behind the open contact on the line. An orienting device in the coach determines the direction criterion, i.e. the direction of the corresponding coach with respect to the locomotive. The addressing process terminates when the number of coaches detected during the addressing sequence agrees with a predetermined desired value. After the addressing, operation, safety and breakdown reports as well as orders can be transmitted between the central station and substations.

The above known arrangement has several drawbacks. With long trains there is extensive dampening on the information line due to two factors: (1) all transmitting and receiving devices lie in parallel on the line and (2) a large number of coupling and relay contacts are arranged in the course of the line. The large number of contacts also results in a lack of reliability and an increased safety risk. Furthermore, a complicated insertion of terminal resistances is required and disadvantageous. A further drawback of this system lies in the fact that recognition of the direction is complicated and sensitive to disturbances.

In the article "Zeitmultiplexe Wendezugsteuerung" (Time Division-Multiplex Reversible Train Control) by W. Deck and R. Schneider, published in BBC-Nachrichten (1976), issue 2/3, pages 103–108, a remote action system for push-pull operation is described. In this operation the locomotive alternately pushes and pulls the train to avoid the need to switch the locomotive before changing the direction of travel of the train. In the case of push-pull trains a control car, which houses all of the important control and indicating circuits, travels at the opposite end of the train from the locomotive. The frequency band for the transmission of information for the push-pull control is divided into three channels: channel 1 from control car to locomotive; channel 2 from the first locomotive to the control car; channel 3 from the second locomotive to the control car. Channel 3 permits the expanding of the system to double heading. In this type of operation the train set consists of two locomotives, a control car and additional cars.

The solution of the problem of double-heating by means of a third frequency channel has, however, numerous disadvantages. The expense required is very great, since additional receiving devices must be provided to handle the third channel. Additionally, each locomotive must have transmitting apparatus for all three channels. After the forming of each train, manual switching operations must be effected depending on the type of operation, namely "single heading", "double heading", or "double heading without push-pull control", and this must be checked, which results in complicated operating instructions for the train personnel.

The object of the present invention is to develop a remote-action system for automatically addressing a plurality of mobile substations from a central station. In the case of a train, for instance, the central station may be a locomotive or a control car while the substations are represented by another locomotive and other cars. The central station is, in this connection, to be connected to the substations only by a two-wire line.

Other special objects of the invention lie in the development of an automatic direction recognition, i.e. recognition of the direction of the central station relative to the substations. Additionally, it should be possible to use the information transmission line for other purposes, i.e. alternating voltages of all frequencies, including direct current voltages, should be capble of being transmitted.

BRIEF SUMMARY OF THE INVENTION

The foregoing objects of the present invention are achieved by galvanically separating the information transmission line at each mobile substation (such that the transmission line at the input of each substation is galvanically separated from the transmission line at its output), and by causing each mobile substation to receive an order signal transmitted from a central station on a first frequency channel (order channel), storing it, and transmitting a report signal over a second frequency channel (report channel) to the central station. After the addressing process is completed at any given substation, the substation receives further order signals from the central station and transfers the order signals, on the side of the substation away from the central station, to other substations and thereafter forwards the report signals received from said other substations on its said other side in the direction towards the central station.

The order and report signals received by the substation are preferably amplified to a standard level before they are forwarded. In the first phase of the addressing process only the unaddressed substation lying closest to the central station is connected with the central station itself. When the addressing process of this substation has been completed, the next following substation is connected with the central station via the substations which have already been addressed. Thus, each substation communicates with the central station only after the substations lying between itself and the central station have completed their communication with the central station. Additionally, each substation communicates with the central station via the substations lying between the substation and the central station.

Among the advantages of the present invention is the fact that the information transmission line is automatically terminated at both the beginning and the end of the train an also at both the front and back end of each station by its characteristic impedance so that unequivocal level conditions are assured even during the addressing process.

Another advantage of the present invention lies in the fact that the direction of the central station relative to the substations is determined by means of direction detectors, consisting of difference amplifiers and diodes, and that this direction is switched and stored by a lock-in storage which has a lock-in relay. As a result of the automatic recognition of this direction, the remote action system is capable of double-heading operation in advantageous fashion.

A further advantage of the present invention is that, the line may carry continuous voltage by means of special transformers. Such a feature is desirable since, due to the possibility of the information transmission line carrying direct current in railway operation, the functions "Doors CLOSED," and "Train Light ON," are further assured. Another advantage of the invention resides in the fact that it is possible to designate a substation as central station by a manual switching operation. In such a case, the direction detectors of said substation are automatically disconnected and the transmitting device of said substation transmits on the first frequency channel (order channel) and the receiving device receives on the second channel (report channel). In this way, one of the substations, or a control car or a locomotive, can be designated as the central station in an advantageously simple manner.

The present invention is furthermore based on the object of developing a circuit arrangement which, despite limitation to a two-wire transmission system, may be formed with only a few structural parts and can be switched in s aimple manner between single and double heading operation, with recognition of direction. To this end, each mobile substation is connected via input and output side coupling contacts with the information transmission line, the secondary windings of first and second transformer whose primary windings are coupled to respective ones of those contacts terminate, in each case, with the characteristic impedance of the line. The secondary windings of these transformers are fed to terminating circuits (fork connections). These terminating circuits are connected with filter circuits for a first and a second frequency channel, respectively. The outputs of the filter circuits are fed via amplifiers to the terminating circuit associated with the remaining coupling contacts and a transmitting device is connected with the filter circuits of the second channel and a receiving device is connected with the filter circuits of the first channel.

In this way, even with long trains, the dampening which occurs on the line is small, since the number of contacts is determined only the coupling contacts and not by relay contacts. Additionally, the critical insertion of a terminating resistor is dispensed with.

A mobile substation is preferably connected via its input and output side coupling contacts with an information transmission line. The coupling contacts are coupled to the primary windings of respective transformers. The characteristic impedance of each line is coupled across the secondary winding of each transformer. The secondary windings are also fed to difference amplifiers as well as attenuator members. The difference amplifiers are connected via diodes with a lock-in relay. The output values of the attenuator members are fed via relay contact sets to filter circuits for a first and a second frequency channel. The filter circuit for the second channel is also fed the output variable of a control device, and the filter circuits are connected by further relay contacts sets with amplifiers. The output of the filter circuits for the first channel are also fed to a receiving device.

By the introduction of the direction detectors consisting of a lock-in relay and difference amplifiers, two filter circuits and two terminating circuits can advantageously be dispensed with.

Furthermore, an input-side coupling contact of each mobile substation is advantageously connected via the primary windings of two transformers having two separate primary windings with the output-side coupling contact and the two wires of the information transmission line are advantageously connected by a capacitor.

BRIEF DESCRIPTION OF THE INVENTION

For the purpose of illustrating the invention, there is shown in the drawings several embodiments which are presently preferred; it being understood, however, that this invention is not limited to the practice arrangements and instrumentalities shown.

DETAILED DESCRIPTION OF THE INVENTION

Figure 1:
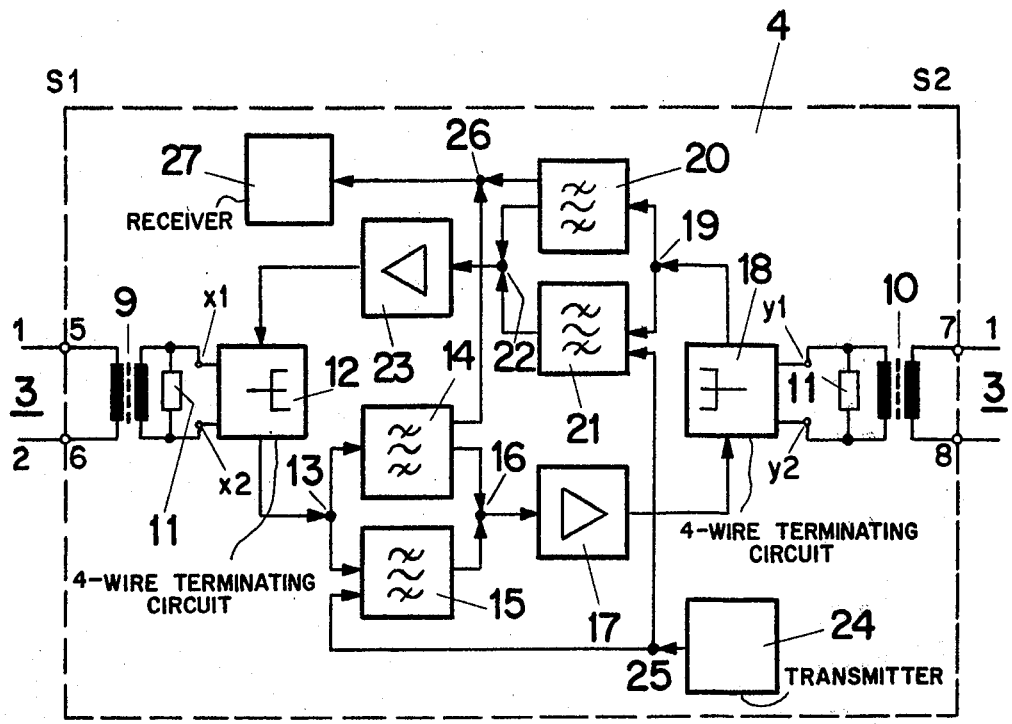
FIG. 1 shows a circuit arrangement in accordance with the invention for a remote-action system of a mobile substation which is suited for automatic addressing from a central station.

Referring now to the drawings, wherein like numerals indicate like elements, there is shown in FIG. 1 a circuit arrangement in accordance with the invention for a remote action system of a mobile substation, which arrangement is suitable for automatic addressing of a central station.

The wires 1 and 2 of an information transmission line 3 are not connected continuously throughout the entire train set but are opened in each mobile substation 4. The line 3 is connected to substaion 4 via input-side coupling contacts 5 and 6 on sides S1 output-side coupling contacts 7 and 8 on side S2. Contacts 5, 6 and contacts 7, 8 are coupled to the primary windings of transformers 9 and 10, respectively. An impedance 11, equal to the characteristic impedance of the line 3, is coupled across the secondary winding of transformers 9 and 10.

The secondary terminals of the transformer 9 are connected with a four wire terminating circuit (matched transformers 12. The output value of this terminating circuit is fed to a junction point 13 which is connected to the inputs of a filter circuit 14 for channel A with a band-pass frequency range A and a filter circuit 15 for channel B with a band-pass frequency range B. The outputs of filter circuits 14 and 15 are combined at junction point 16 and applied to the input of an amplifier 17. The output of amplifier 17 is applied to an input terminal of four wire terminating circuit 18. Terminating circuit 18 is connected with the secondary terminals of the transformer 10.

The output signal of terminating circuit 18 is fed to junction point 19 which is connected to filter circuit 20 for channel A (band-pass frequency range A) and filter circuit 21 (band-pass frequency B) for channel B. The output of filter circuits 20 and 21 are combined at junction point 22 and applied to the input of an amplifier 23. The output of amplifier 23 is applied to an input terminal of the terminating circuit 12.

The output signal of a transmitting device 24 is fed via a junction point 25 to both an input of the filter circuit 15 for channel B and an input of the filter circuit 21 for channel B. The output signals of the filter circuit 14 for channel A and of the filter circuit 20 for channel A are fed via a junction point 26 to a receiving device 27.

Figure 2:
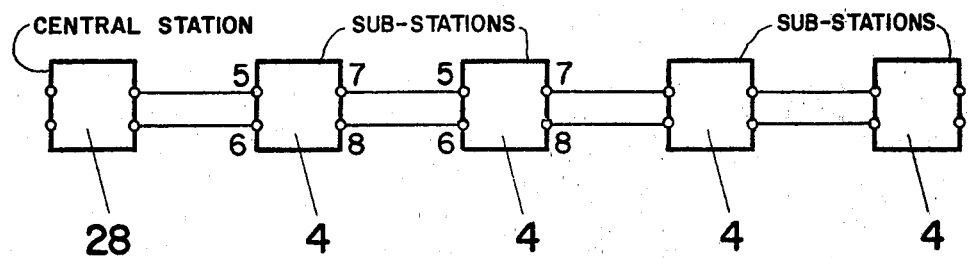
FIG. 2 shows a set of trains formed of four mobile substations and a central station.

FIG. 2 shows an assembled train set which consists, for example, of four mobile substations 4 and a central station 28. The train set is connected by the information transmission line 3. If the central station 28 now transmits a signal in the first frequency channel (channel A), reception of the signal is received by substation 4 which both evaluates the signal and transmits it to the remaining substations. Thus, the signal is forwarded from input S1 via terminating circuit 12, reception filter circuit 14, amplifier 17, and terminating circuits 18 to output side S2 with a normal level so that each of the four substations 4 on channel A can receive the order signal generated by the central station 28. The output signal of the reception filter circuit 14 for channel A is fed to a receiving device 27 for evaluation. A transmitting device 24 is activated by substation 4 if the latter has been addressed by central station 28 and thereupon a report is sent back to central station 28 via channel B.

In principle, the side of a substation 4 towards central station 28 receives and forwards signals in the "order" channel (channel A) to the side away from the central station, amplified to predetermined level. On the other hand, the substation 4 transmits in the "report" channel (channel B) to the central station 28 and forwards—amplified to a normal level—the reports received on channel B on the side away from the central station 28 to the side towards the central station.

An addressing process in accordance with the present invention will now be described. Initially, the central station 28 generates an "address-process" order signal which causes amplifiers 17 and 23 to be disconnected in all substations 4. Thereafter, the central station 28 generates the order signal "store address 01". Only the first substation 4 behind the central station 28 can receive this order signal and, as a result of the preparation by the "address process" order, store the address 01 in the receiving device 27. After storage has been effected, this substation 4 activates its transmitting device 24 and transmits a report telegram with the address acknowledgment in a second frequency channel, channel B. The amplifiers are again connected in this first substation 4.

After receipt of the report telegram, the central station 28 sends out a "store address 02" order signal. This order signal passes, via the first substation 4, to the next substation 4, which is still prepared for addressing by the first "address process" order signal. After storing and reply/acknowledgment, another order signal "store address 03" is generated. This process is repeated for each substation. The order signal therefore contains an address portion the address of which is increased by 1 with each order signal. The address process continues until the last substation has acknowledged.

Since addressing is always effected continuously from the central station, the substation closest to the central station also always receives the address 01, the next station the address 02, etc. The central station itself is addressless, i.e. it is not ascribed any address in the addressing process.

Figure 3:
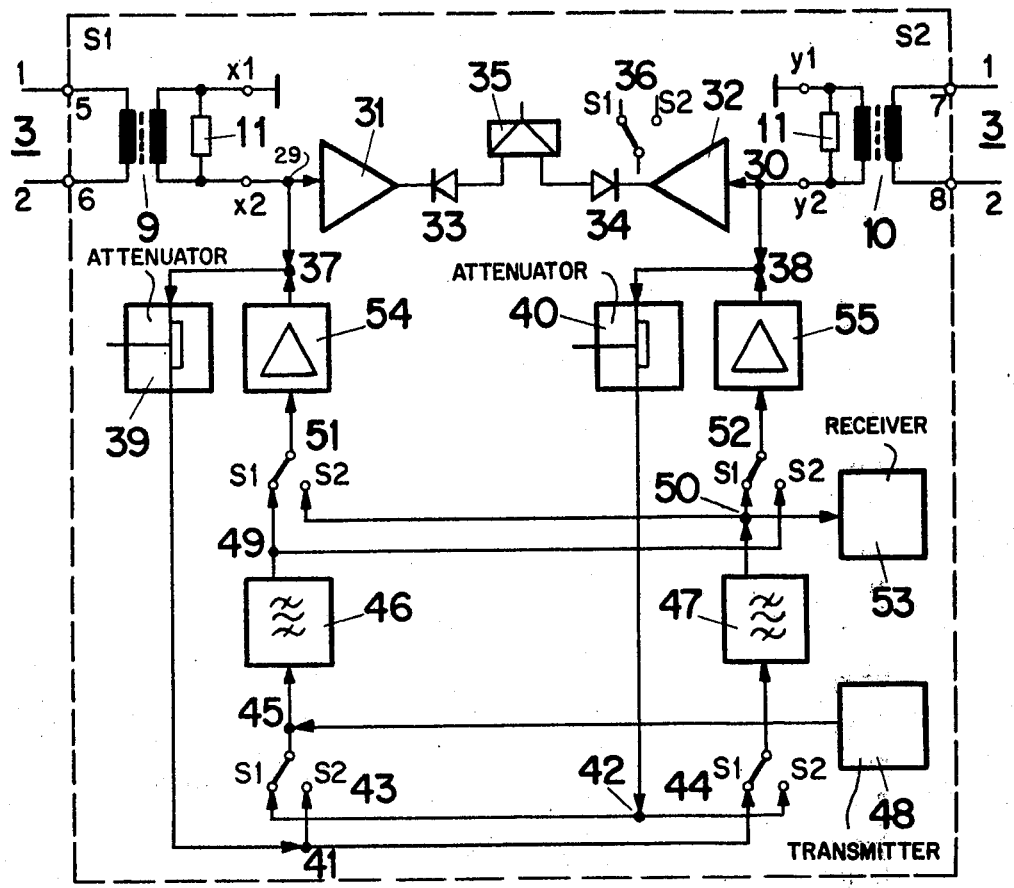
FIG. 3 shows a circuit arrangement in accordance with the invention for a remote-action system of a mobile substation which is suitable for automatic addressing and recognition of direction.

In addition to the general task of developing a remote action system for an automatic addressing of several mobile substations from a central station, direction recognition may be desired, i.e. the direction is to be determined in which the central station lies as seen from the substation. This problem arises, for instance, in the case of double heading. The circuit arrangement in accordance with the invention for this is shown in FIG. 3.

The wires 1 and 2 of the information transmission line 3 are connected via the input-side coupling contacts 5 and 6 and the output-side coupling contacts 7 and 8, respectively, with transformers 9 and 10, respectively, as well as resistances 11 in the same manner as described under FIG. 1. One of the secondary terminals of each of the transformers 9 and 10, respectively, is grounded, while the other secondary terminal is fed to junction points 29 and 30, respectively.

These junction points 29 and 30 are connected to difference amplifiers 31 and 32, respectively, and furthermore to diodes 33 and 34, respectively, each of which is connected in opposition to the signal-flow direction which is defined as positive. The anodes of the diodes 33 and 34 are connected with the input terminals, and thus with the two coils, of a lock-in relay 35. The position of a relay contact set 36 determines whether the order signals generated by the central station 28 is fed into the substation 4 from side S1 or from side S2. Relay contact set 36 is coupled to the remaining relay contact sets 43-44 and 51-52 and changes position with them. Accordingly, the manner in which the various components of the substation are connected is controlled by the state of relay 35 and therefore by the position of the substation relative to the central station.

The junction points 29 and 30 are connected furthermore to junction points 37 and 38, which in their turn are fed to attenuators 39 and 40, respectively. The outputs of attenuators 39 and 40 are fed via junction points 41 and 42 to the relay contact sets 43 and 44, respectively, of the lock-in relay 35. The output of the attenuator 39 lying on side S2 contact of contact set 43 and on the side S1 contact of contact set 44. The output of the attenuator 40 lying on the side S1 contact of contact set 43 and on the side S2 contact of contact set 44.

The remaining contacts of contact sets 43 and 44 are fed to filter circuits 46 and 47, for channel B and channel A, respectively. The output of transmitting device 48 is also fed to filter circuit 46 via junction point 45.

The output of filter circuits 46 and 47 are connected to junction points 49 and 50, respectively. Junction point 49 is connected to both the side S1 contact of a relay contact set 51 and to the side S2 contact of a relay contact set 52. Junction point 50 is connected to the side S2 contact of contact set 51 and to the side S1 contact of contact set 52. Junction point 50 is also fed to a receiving device 53. Contact sets 51 and 52 are associated with the lock-in relay 35.

The remaining contacts of contact sets 51 and 52 are connected with amplifiers 54 and 55, respectively. The outputs of amplifiers 54 and 55 are fed to the junction points 37 and 38, respectively.

The side of a substation 4 which faces the central station 28 now receives the channel A order signal and forwards this signal to the side away from the central station, as previously described. The directional switching of filter circuits 46 and 47 takes place, (and therefore of the substation ) is controlled by switching the relay sets 36, 43–44 and 51–42 between their positions S1, S2. As such, filter circuits 46 and 47 may be both receiving and transmitting filters. For direction recognition, only the central station 28 transmits initially. This signal is detected by the direction detector comprising difference amplifiers 31 and 32 and diodes 33 and 34. The direction is stored in a lock-in storage 56 which comprises part of the circuit of FIG. 3 and is illustrated in detail in FIG. 4. Two direction detectors may be used for reasons of safety.

Figure 4:
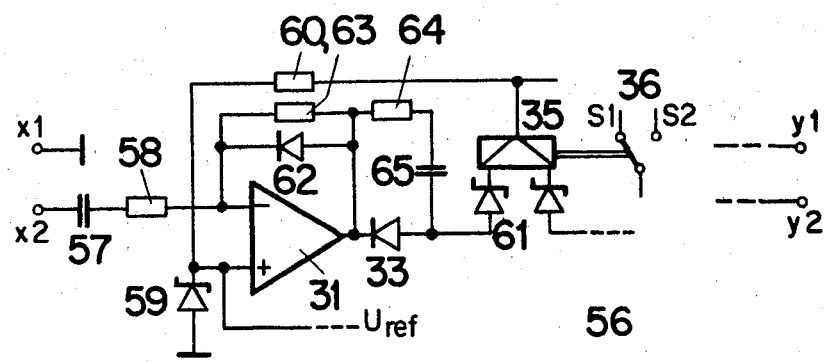
FIG. 4 is a lock-in storage for the recognition and storing of direction.

FIG. 4 shows the lock-in storage 56. The inverting input of difference amplifier 31 is connected via a capacitor 57 and a series resistor 58 to the switch point X2 of the circuit arrangement shown in FIG. 3. Its non-inverting input is connected to a predetermined reference voltage determined by voltage $U_{ref}$ and Zener diode 59. The non-inverting input of amplifier 31 is also connected via resistor 60 to the common output terminal of lock-in relay 35. The output of the difference amplifier 31 is connected via the diode 33 and Zener diode 61 to the input of a relay coil of the lock-in relay 35.

A diode 62 and a resistor 63 are connected in parallel to the difference amplifier 31 between its inverting input terminal and its output terminal. The diode 33 is shunted by a series connected resistor 64 and capacitor 65. Only the half of lock-in storage 56 associated with side S1 of substation 4 is illustrated in FIG. 4. A second similarly connected half is associated with side S2. The lock-in relay 35 with its set of contacts 36 is common to the two halves.

If the direction has been detected by the direction detectors of the first substation 4 and switched and stored by the lock-in storage, the transmission signal generated by the central station 28 is forwarded to the other side of substation 4 so that all following substations 4 also switch in proper direction.

Figure 5:
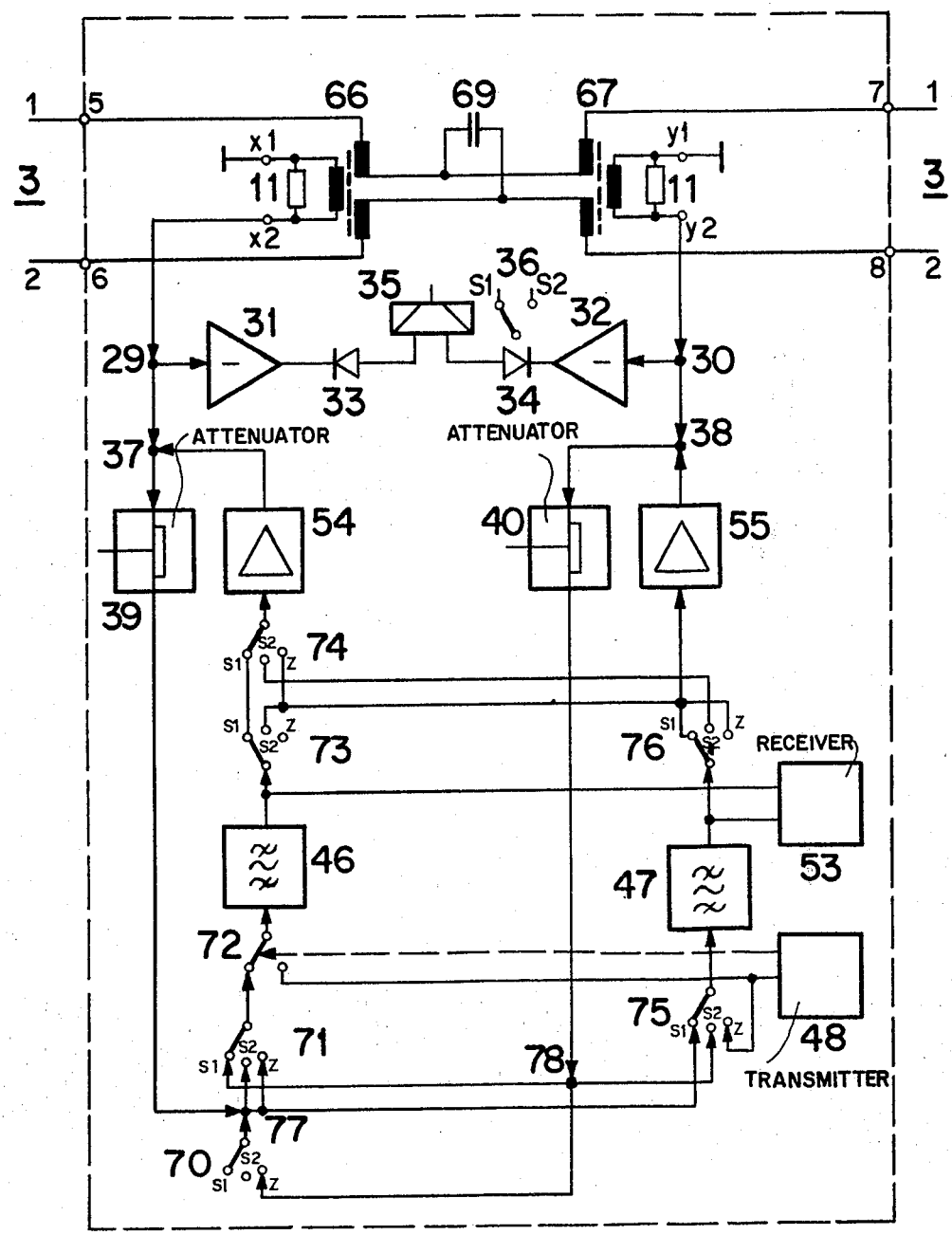
FIG. 5 is a circuit arrangement of a remote reaction system of a mobile substation, said arrangement passing direct current and being suitable for double heading.

In embodiments where it is desirable for the information transmission line 3 to carry direct current in addition to the frequencies of channels A and B, the information transmission line 3 is decoupled in accordance with FIG. 5 at the individual substations 4.

In this case, the wires 1 and 2 of the information transmission line 3 are connected, in the same manner as described under FIGS. 1 and 3, with the input and output side coupling contacts 5 and 6 and 7 and 8, respectively. To these contacts there are connected transformers 66 and 67, respectively, each of which has two separate primary coils and a secondary coil inductively connected with them. The primary coils of the transformer 66 are connected with the primary coils of the transformer 67. A capacitor 69 short circuits the primary coil of each transformer 66, 67 for alternating current. The outputs of the secondary coils of the transformers 66 and 67, respectively, are designated X1 and X2 and Y1 and Y2, respectively.

The circuit arrangement of a remote action system of a mobile substation which has been shown in FIG. 5 possesses each of the inventive features shown in the embodiments of FIGS. 1, 3 and 4. Additionally, it satisfies each of the requirements of a system which is capable of double heading.

In its essential details, the circuit arrangement of FIG. 5 is identical to the arrangement in FIG. 3. In this embodiment, however, the relay contact sets 51, 52, 43, and 44 are omitted and replaced by relay contact sets 70–76. The individual switch positions are in this connection defined as follows:

S1: central station is on side 1 of the substation;
S2: central station is one side 2 of the substation;
Z: the substation is itself designated as central station.

While the switch positions S1 and S2 are automatically switched via the lock-in relay, the switch position Z (central) is selected manually, for instance by means of an additional switch, not shown here.

The output of the transformers 66 and 67 are fed via the switch points X1, X2 and Y1, Y2 to both difference amplifiers 31 and 32 to attenuators 39 and 40, respectively.

The output of the attenuator 39 is fed to a junction point 77. At this junction point 77 there are present the S2 contact as well as the Z contact of the contact set 71, the S1 contact of the contact set 75 and the fixed contact of the contact set 70. The output of the attenuator 40 is fed to a further junction point 78. At this junction point 78 there are located the S1 contact of the contact set 71, the S2 contact of the contact set 75, and the Z contact of the contact set 70.

The stationary contact of the contact set 71 is switched with the S1 contact of the contact set 72, while the S2 contact of this set 72 is connected with the transmission device 48 which also is connected simultaneously to the Z contact of the set 75. The outputs of the sets 72 and 73 are connected to the filter circuits 46 and 47 for channel B and for channel A, respectively. The outputs of filter circuits 46 and 47 are fed to further contact sets 73 and 76, respectively. The stationary contacts of sets 73 and 76 are furthermore fed to the receiving device 53.

The relay contact set 73 is connected in the following manner with the set 76 and a further contact set 74: the S1 contacts of 73 and 74, the S2 contacts of 74 and 76 and the Z contacts of 74 and 76 in each case are connected directly; the Z contact of 74 is furthermore fed to the S2 contact of 73, the S1 contact of 76 and the amplifier 55, and the stationary contact of 74 is connected to the input of the amplifier 54.

If a vehicle has, by manual selection of the switch position Z been designated as the sole one of the train set to be the central station 28, it transmits on the order channel A and receives on the report channel B. At the same time, the result is obtained that the direction detectors in this vehicle do not respond, that the transmission level is imparted to both sides of the line, and that the receiving level can be received from both sides of the line.

All stations not designated as central station are substations, i.e. they receive orders on channel A, carry out these orders and forward levels of channel A to the side of the line facing away from the central station. On the other hand, they receive reports in channel B from other substations and forward them to the central station.

If the substation 4 is itself acted on by the central station 28, it transmits its reports in channel B. The "substation" type of operation is defined by the two positions "side 1," "side 2" of the relay contact sets 70 to 76. In position "side 1" for instance, the substation receives reports on side 2 and forwards them to line side 1. Orders are received on side 1 and forwarded to side 2. If the substation itself is not spoken to, it sends out a report telegram by closing the relay contact set 72.

Depending on the type of operation "central" or "substation," the transmitting device 48 must be switchable between the keying frequencies of channel A and of channel B. In the same way of receiving device 53 consists of two parts; in the "central" manner of operation it demodulates the frequency channel B and in the "substation" manner of operation it demodulates channel "A".

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for automatically addressing a plurality of mobile substations from a mobile central station, comprising:
   (A) a central station processing circuit located at said central station and including a pair of coupling contacts, said central station processing circuit including first means for:
      (1) generating command signals in a first frequency channel and applying said command signals to said central station coupling contacts; and
      (2) receiving and processing report signals applied to said central station coupling contacts;
   (B) a plurality of mobile substation processing circuits equal in number to a number of said mobile substations, each of said mobile station processing circuits located at a different one of said mobile substations and including a front side and a rear side pair of coupling contacts, each of said mobile substation processing circuits also including second means for:
      (1) evaluating control signals applied to its front side coupling contacts and report signals applied to its rear side coupling contacts;
      (2) generating a report signal in a second frequency channel and applying said report signal to its front side contacts when the command signal applied to its front side coupling contacts addresses the mobile substation and which said substation processing circuit is located;
      (3) reproducing said control signal applied to its front side contacts when the command signal applied to its front side contact addresses a mobile station other than the mobile station at which said substation processing circuit is located and applying said reproduced control signal to its rear side contacts; and
      (4) reproducing said report signals applied to its rear side coupling contacts and applying said reproduced report signals to its front side coupling contacts;
   (C) a plurality of two wire lines equal in number to the number of said mobile substations, one end of each of said two wire lines being electrically coupled to a different pair of said front side coupling contacts, the remaining end of each of said two wire lines being electrically coupled to either a different pair of said rear side coupling contacts or to said central station coupling contacts in such a manner that each of said substation processing circuits are coupled in series with both the remaining said substation processing circuits and with said central station processing circuit; and
   (D) each of said mobile substation processing circuits adapted to galvanically separate its front side coupling contacts from its rear side coupling contacts.

2. The apparatus of claim 1, wherein said first means generates command signals in such an order that each said substation processing circuit receives a command signal identifying the substation at which it is located before it receives a command signal identifying a different said substation, and further that said command station processing circuit receives a report signal from the substation it last addressed before it addresses the next said substation.

3. The apparatus of claim 2, wherein said command and report signals received by each said substation processing circuit are amplified to a predetermined level when they are reproduced by said second means.

4. The apparatus of claims 1, 2 or 3, wherein each of said substation processing circuits further includes:
   (A) switch means for connecting a first and a second pair of coupling contacts to said second means, said switch means operable in:
      (1) a first mode wherein said first and second pair of coupling contacts are connected to said second means in such a manner that said first pair of coupling contacts define said front side coupling contacts and said second pair of coupling contacts define said rear side coupling contacts; and
      (2) a second mode wherein said first and second pairs of coupling contacts are connected to said second means in such a manner that said first pair of coupling contacts define said rear side coupling contacts and said second pair of coupling contacts define said front side coupling contacts; and
   (B) direction detector means for determining the direction, in an electrical sense, of said central station relative to the substation at which said detector means is located and for operating said switch means in said first and second modes as a function of said determination.

5. The apparatus of claim 4, wherein each of said substation processing circuits further include means for permitting the continual passage of d.c. voltage between said two wire lines via said substation processing circuits.

6. The process of claim 4, wherein each of said substation processing circuits further includes manual switching means for designating the substation at which said manual switching means is located at said central station.

7. The apparatus of claims 1, 2 or 3, wherein each of said substation processing circuits comprise:
   first and second transformers associated with said front side and said rear side coupling contacts, respectively, the primary windings of said first and second transformers being coupled to said front side and rear side coupling contacts, respectively, the secondary windings of said first and second transformers being coupled across an impedance element having the characteristic impedance of said two wire lines to which said front side and rear side coupling contacts are coupled, respectively;
   first and second terminating circuits coupled to said secondary windings of said first and second transformers, respectively;
   an output of each of said terminating circuits being coupled to inputs of first and second pairs of filter circuits, respectively, one said filter in each of said filter pairs adapted to pass said first frequency channel, the remaining filter of each of said first and second pairs of filter pairs adapted to pass said second frequency channel;
   the outputs of said first and second filter pairs being fed to inputs of said second and first terminating circuits, respectively, via first and second amplifiers, respectively;
   a transmitting device whose output is coupled to said remaining filter of each of said filter pairs; and
   a receiver device whose input is coupled to an output of each of said first filters of said filter pairs.

8. The apparatus of claims 1, 2, or 3, wherein each said substation processing circuits comprise:
   first and second transformers associated with said front side and said rear side coupling contacts, respectively, the primary windings of said first and second transformers being coupled to said front side and rear side coupling contacts, respectively, the secondary windings of said first and second transformers being coupled across an impedance element having the characteristic impedance of said two wire lines to which said front side and rear side coupling contacts are coupled, respectively;
   first and second difference amplifiers;
   first and second attenuators;
   said secondary windings of said first and second transformers being coupled to an input of both said first and second difference amplifiers and said first and second attenuators, respectively;
   the outputs of said first and second attenuators being coupled to a lock-in relay via first and second diodes, respectively;
   first and second filters for passing said first and second frequency channels respectively;
   a transmitting device whose output is coupled to an input of said second filter;
   a receiving device whose input is coupled to an output of said first filter;
   a first amplifier whose output is coupled to both an input of said first difference amplifier and an input of said first attenuator;
   a second amplifier whose output is coupled to both an input of said second difference amplifier and an input of said first attenuator;
   a first relay contact set movable between a first position and a second position, said first relay contact set adapted to apply the outputs of said first and second attenuators to the input of said first and second filter circuits, respectively, when said first relay contact set is in its first position and adapted to apply the outputs of said first and second attenuators to said second and first filter circuits, respectively, when said relay contact set is in its second position; and
   a second relay contact set movable between a first and a second position, said second relay contact sets for applying the output of said first and second filter circuits to the input of said second and first amplifiers, respectively, when said second relay contact set is in its first position and for applying the outputs of said first and second filter circuits to said first and second amplifiers, respectively, when said second relay contact set is in its second position;
   said lock-in relay controlling the positions of said first and second relay contact sets.

9. The apparatus of claim 4, wherein each of said substation processing circuits include first and second transformers associated with said front side and rear side coupling contacts, respectively, each of said transformers having first and second primary windings and a secondary winding, one end of each of said first and second primary windings of said first transformer being coupled to a different one of said pair of front side coupling contacts, one end of said first and second primary windings of said second transformer being coupled to a different one of said rear side coupling contacts, the remaining ends of said first and second primary windings of said first transformer being coupled to respective ones of the remaining ends of said first and second primary windings of said second transformer and wherein said means for permitting the continual passage of d.c. voltage between said two wire lines comprises a capacitor coupled between said remaining ends of said first primary windings of said first and second transformer and said remaining ends of said second primary winding of said first and second transformers.

* * * * *